(No Model.) 2 Sheets—Sheet 1.
P. C. JUST.
CONDUCTOR FOR ELECTRIC RAILWAYS.
No. 544,306. Patented Aug. 13, 1895.
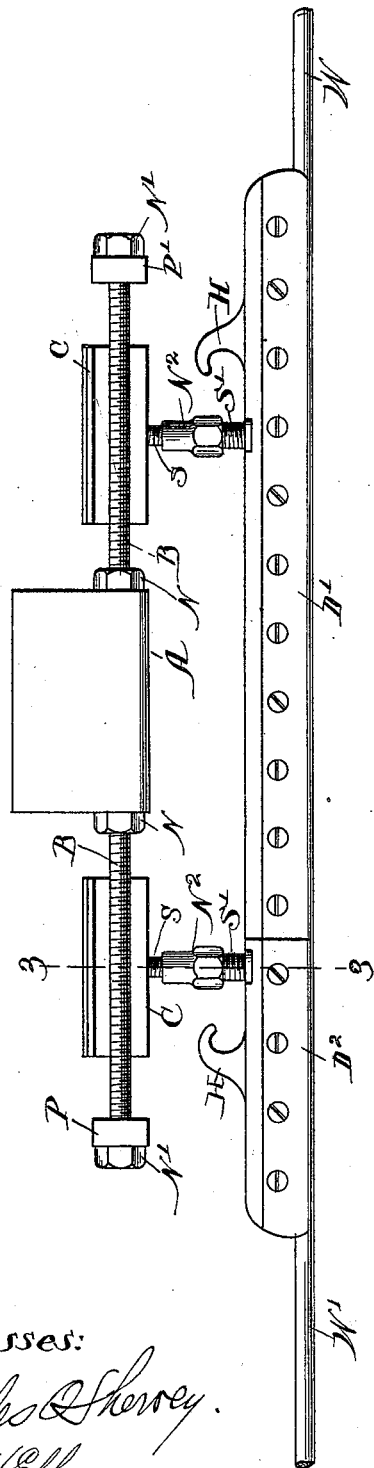
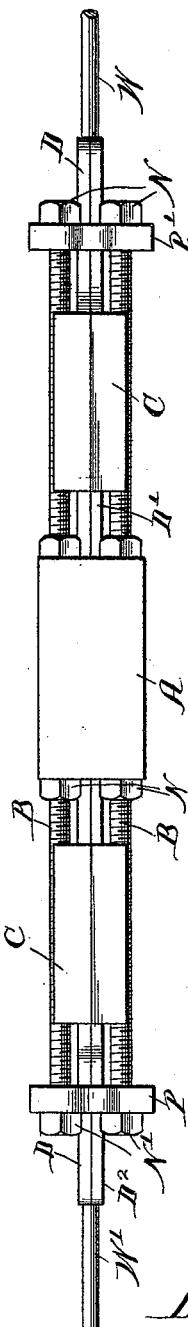
Witnesses:
Charles O. Hervey.
A. J. H. Ebbesen
Inventor:
Paul C. Just
By Wiles, Greene & Bitner
Attys

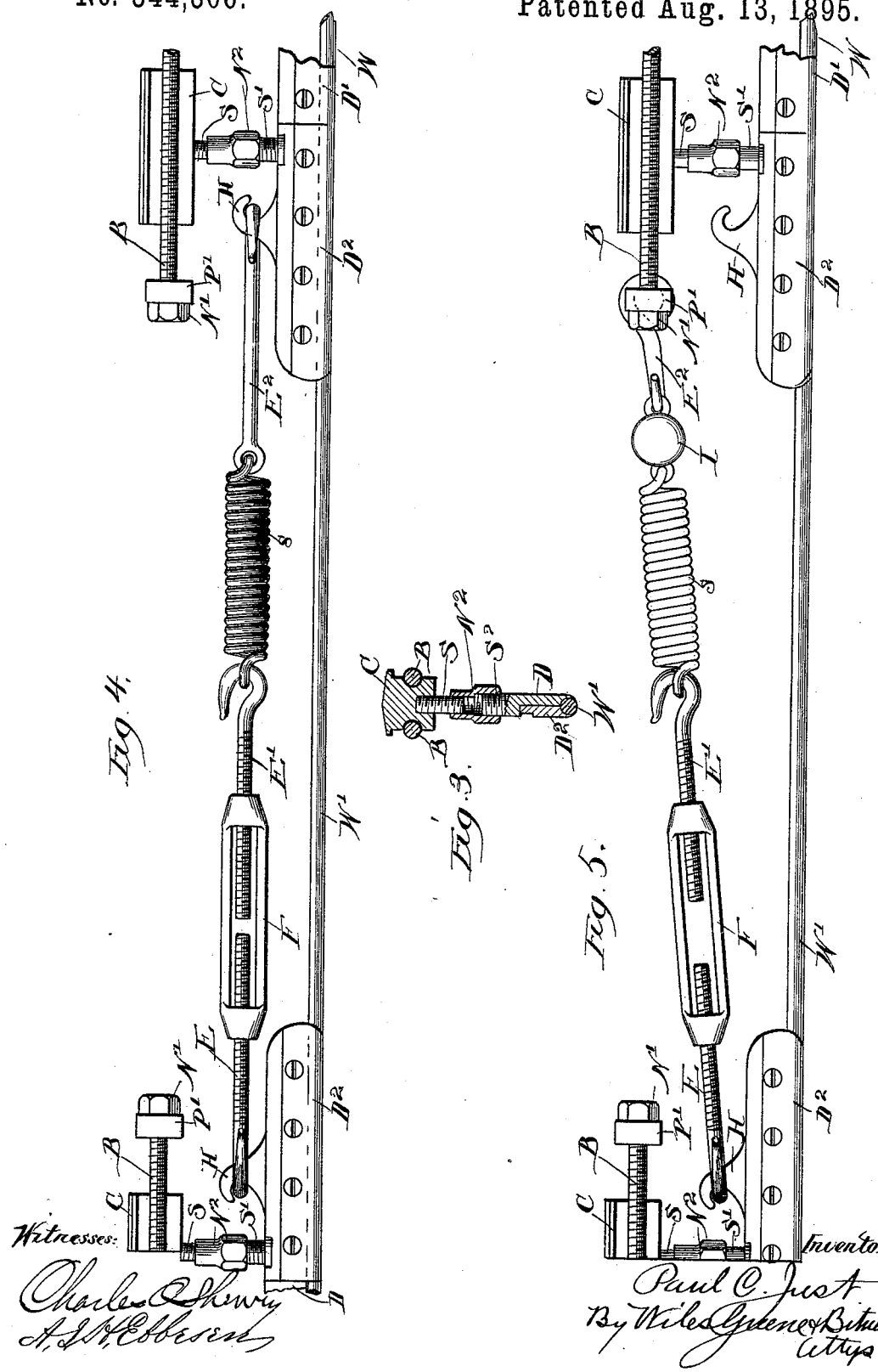

UNITED STATES PATENT OFFICE.

PAUL C. JUST, OF CHICAGO, ILLINOIS, ASSIGNOR TO ALBERT G. WHEELER, OF SAME PLACE.

CONDUCTOR FOR ELECTRIC RAILWAYS.

SPECIFICATION forming part of Letters Patent No. 544,306, dated August 13, 1895.

Application filed February 6, 1893. Serial No. 461,106. (No model.)

*To all whom it may concern:*

Be it known that I, PAUL C. JUST, a citizen of the United States of America, residing at Chicago, in the county of Cook and State of Illinois, have invented certain new and useful Improvements in Conductors for Electric Railways, of which the following is a specification.

My invention relates to improvements in conductors for electric railways, its object being to provide a conductor so supported as to allow expansion and contraction under changes of temperature without danger of breakage of the conductor or interruption of the current.

The invention is fully described and explained in this specification, and shown in the accompanying drawings, in which—

Figure 1 is a side elevation of a conductor-support and conductor embodying my improvements. Fig. 2 is a top plan of the same. Fig. 3 is a transverse vertical section of the conductor through the line 3 3, Fig. 1. Fig. 4 is a side elevation of the adjacent ends of two conductor-supports of the construction illustrated in the previous figures, together with an extensible connection for the two conductors. Fig. 5 is a similar view of two conductor-supports provided with a differently-applied extensible connection.

In the views, A is a stationary bracket adapted to be fastened to the yoke of a conduit, or to any other suitable stationary support.

B B are parallel and preferably screw-threaded rods rigidly set in the bracket and extending on opposite sides thereof, longitudinal movement of the rods in the bracket being prevented by nuts N N on opposite sides of the bracket or by other suitable fastening devices, and the ends of the rods B B being connected by transverse plates P P', held in place by nuts N' N'.

On each side of the bracket A and between the rods B B lies an insulating-block C C of suitable non-conducting material, having in its side faces longitudinal grooves which embrace the rods and hold the block in place, the block being, however, free to slide longitudinally upon the rods under the application of sufficient force. Each of the blocks has in its lower face a downwardly-projecting screw-threaded bolt S.

Beneath the conductors C C is a wire-clamp made up of three plates D D' D², the plate D being of the same length as the entire clamp, and the plates D' D² being abutted against each other and being together of the same length as the plate D. The plate D has on its upper edge two integrally-formed upwardly-extending screw-threaded bolts S' S', which lie immediately beneath the bolts S S, respectively, and are connected with them by right and left hand nuts N² N². In use the plate D' of each conductor-support is permanently fastened to the plate D, and the conducting-wire W is inserted between their lower edges, which are internally grooved to conform substantially to its surface. The conductor is soldered in place between the clamping-plates, its end being coincident with the inner end of the plate D'. The plate D² is bolted to the plate D, and the end of a second wire W' is inserted in the space between the lower edges of the two plates D D², and is held more or less firmly by the pressure of the screws which holds the plates together.

The form of conductor-support thus far described is extremely convenient as a means of testing the different sections of a line of electric conductors, since the plate D² may readily be loosened from the plate D and the end of the wire W' withdrawn from its contact with the hanger, thus breaking the continuity of the line and rendering the sections temporarily independent of each other.

A further and even more important use of the device is in providing an extensible connection for different sections of the same conductor, the object of the section being to permit free contraction and expansion of the sections. In this use of the device two supports like that illustrated in Figs. 1, 2, and 3 are arranged with a suitable space between them, their adjacent ends being shown in Figs. 4 and 5, and the detachable plates D² D² of the two sections being adjacent to each other. The main wires W W of the two adjacent sections of the conductor are soldered in place in the outer ends of the two supports, and the loose rod W' has its ends clamped somewhat loosely between the plates D D² of the respective supports. It is evident that as the wires W W of the two adjacent sections contract the two supports may be drawn apart, the insulating-blocks C C of each support being free to move along the rods B B, on which they are hung, and the ends of the rod W' being free to slip between the plates D D² of the supports. In order to insure the return of the supports to their normal positions when the wires W W expand under the influence of higher temperature it is necessary to provide some suitable elastic connection for the supports. Such a connection is shown in Fig. 4, in which E is a rod provided at one end with a hook or eye engaging a hook H, formed on the plate D of one of the two adjacent supports, the opposite end of the rod being in engagement with the corresponding end of a turnbuckle F, whose opposite end engages one end of a screw-threaded rod E'. The opposite end of the rod E' is hooked to the end of a spring $s$, which is connected by a second rod E² or other suitable means with a second hook H, formed on the plate D of the other support. It is evident that as the two conductor-supports are drawn apart through the contraction of the wires W W the spring $s$ must be extended and that the elasticity of the spring must tend to bring the supports again to their normal position when the wires expand. I have found in practice that a spring of comparatively small size and weight is amply sufficient to compensate for the contraction and expansion of the wires, and thus to keep the different sections of the conductor constantly stretched taut.

The form illustrated in Fig. 4 is that which I employ in connecting the supports of different sections of a straight-line conductor. On curves, however, I have found it advisable to fasten the elastic connection at one end to the plate D of one of the two adjacent conductor-supports, but to fasten it at the other end to the end plate P' of the other support, thus anchoring it indirectly to the bracket A. When this method of connection is employed it is necessary to interpose an insulator between the different parts of the elastic connection, and I have accordingly placed between the spring $s$ and the rod E² an insulating-ball I of ordinary and well-known construction, this insulator being intended to prevent short-circuiting through the elastic connection and the bracket to the earth.

Having now described and explained my invention, what I claim as new, and desire to secure by Letters Patent, is—

1. In a conductor of the class described, the combination with the adjacent ends of two conductor sections, of a suitably supported clamp of conducting material which is rigidly attached at one end to one of said adjacent conductor ends, and is provided at its opposite end with a detachable clamping plate connected with the body of the clamp by adjustable securing means, whereby the said plate may be loosened to permit sliding of the other conductor-end within the clamp, or may be made to clamp the said conductor-end more or less tightly as desired, substantially as described.

2. In a conductor of the class described, the combination with the contiguous ends of two conductor sections, of a clamp made up of suitably connected opposing plates adapted to clasp the ends of the conductor sections, a portion of one of the clasping plates being detachable to permit withdrawal of the corresponding end of the conductor section; substantially as shown and described.

3. The combination with the conductor sections, W, W', of the clamp provided with suitable means for its suspension and made up of the plates, D, D', D², the plate, D, forming one jaw of the clamp and the plates, D', D², the opposite jaw, and the plate, D², being detachable; substantially as shown and described.

4. The combination with the conductor-sections W W', of the clamp consisting of the plates D D' D², of which the plates D D' are rigidly connected together with one conductor-end located between them and secured thereto by solder, and the plate D² is attached to the plate D by adjustable securing means by which the other conductor-end may be held or clamped more or less tightly as desired, substantially as described.

5. In a conductor of the class described, the combination with the contiguous ends of two conductor sections, W, W, of clamps rigidly fastened to the ends of said sections and provided with means for their support, an intermediate conductor section supported by said clamps but free to move longitudinally in one of them, and an elastic connection interposed between said clamps and tending to draw them together, whereby the distance between said clamps may vary with the expansion and contraction of the conductor sections.

6. In a conductor of the class described, the combination with the contiguous ends of two conductor sections, of clamps rigidly fastened to the ends of said sections, and provided with means for their suspension, an intermediate conductor section supported by said clamps but free to slide longitudinally therein, and an elastic connection interposed between the clamps and tending to draw them together, whereby the distance between them may vary with the expansion and contraction of the conductor sections.

7. The combination with the conductor sections, W, W, of two clamps, each made up of plates, D, D', D², an intermediate section W', lying between the clamps and supported by them, and a spring connection formed substantially as shown and described, tending to draw the clamps together, the ends of the sections, W, W, being rigidly fastened between the plates, D, D', of the corresponding clamps, and the ends of the section, W, being loosely held between the plates, D, D², of the two clamps.

8. The combination with two suitably separated stationary brackets, A, A, of rods, B, B, supported by said brackets, insulators, C, C, supported by said rods and free to slide thereon, conductor clamps supported by said insulators, conductor sections supported by said clamps, and a spring connection interposed between the clamps, and tending to draw them together; substantially as shown and described.

9. The combination with the brackets, A, A, rods B, B, insulators, C, C, and conductor clamps supported by said insulators and free to slide with reference to the brackets, of the spring connection interposed between the clamps and provided with means for adjusting its length and thereby varying its tension; substantially as shown and described.

10. The combination with the brackets, A, A, and clamps, D, D', D², suspended therefrom and free to slide with reference thereto substantially as shown and described, of the interposed spring connection made up of rods, E, E', a suitable spring and a turnbuckle connecting the rods and adapted to vary the length of the entire connection; substantially as shown and described.

11. The combination with suitable supporting means of the clamps made up of plates, D, D', D², substantially as shown and described, and the spring connection, E, E', s, interposed between the clamps, the plate, D, of each of the clamps being formed with a hook, F, adapted to receive the corresponding end of the spring connection; substantially as shown and described.

PAUL C. JUST.

Witnesses:
R. H. WILES,
CHARLES O. SHEWEY.